United States Patent
Ohashi et al.

(10) Patent No.: US 9,741,989 B2
(45) Date of Patent: Aug. 22, 2017

(54) POLYOLEFIN MICROPOROUS MEMBRANE

(71) Applicant: Asahi Kasei Chemicals Corporation, Tokyo (JP)

(72) Inventors: Masahiro Ohashi, Moriyama (JP); Hiroshi Sogo, Moriyama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 438 days.

(21) Appl. No.: 14/280,431

(22) Filed: May 16, 2014

(65) Prior Publication Data

US 2014/0255753 A1 Sep. 11, 2014

Related U.S. Application Data

(62) Division of application No. 11/664,276, filed as application No. PCT/JP2005/018013 on Sep. 29, 2005, now abandoned.

(30) Foreign Application Priority Data

Oct. 1, 2004 (JP) ................................. 2004-290122

(51) Int. Cl.
*H01M 2/16* (2006.01)
*B32B 27/32* (2006.01)

(52) U.S. Cl.
CPC ........... *H01M 2/1686* (2013.01); *B32B 27/32* (2013.01); *H01M 2/1653* (2013.01); *Y10T 428/24998* (2015.04); *Y10T 428/249978* (2015.04)

(58) Field of Classification Search
CPC .. H01M 2/1653; H01M 2/164; H01M 2/1686; H01M 2/166
See application file for complete search history.

(56) References Cited

U.S. PATENT DOCUMENTS

| | | | |
|---|---|---|---|
| 4,777,073 A * | 10/1988 | Sheth .................. | B29D 7/01 264/288.4 |
| 4,791,144 A | 12/1988 | Nagou et al. | |
| 5,240,655 A * | 8/1993 | Troffkin .............. | B02C 19/0087 264/154 |
| 5,731,074 A * | 3/1998 | Nishiyama ............ | B32B 3/26 264/154 |
| 5,824,430 A * | 10/1998 | Higuchi ................ | B32B 27/32 428/316.6 |
| 5,948,557 A * | 9/1999 | Ondeck ................ | C08J 5/18 361/502 |
| 6,080,507 A | 6/2000 | Yu | |
| 6,127,438 A | 10/2000 | Hasegawa et al. | |
| 6,168,858 B1 | 1/2001 | Hasegawa et al. | |
| 6,627,346 B1 | 9/2003 | Kinouchi et al. | |
| 7,374,843 B2 | 5/2008 | Adachi et al. | |
| 7,618,743 B2 | 11/2009 | Ohashi et al. | |
| 7,790,321 B2 | 9/2010 | Hennige et al. | |
| 8,104,625 B2 | 1/2012 | Nagashima et al. | |
| 2003/0035943 A1 * | 2/2003 | Jones .................. | B32B 27/32 428/317.9 |
| 2003/0180525 A1 | 9/2003 | Strack et al. | |

FOREIGN PATENT DOCUMENTS

| | | |
|---|---|---|
| CN | 1298209 A | 6/2001 |
| EP | 1 454 742 A2 | 9/2004 |
| EP | 1 464 669 A1 | 10/2004 |
| JP | 4-38101 | 6/1992 |
| JP | 8-244152 | 9/1996 |
| JP | 8-250097 | 9/1996 |
| JP | 11-80395 | 3/1999 |
| JP | 2000-208123 A | 7/2000 |
| JP | 2001-266828 | 9/2001 |
| JP | 2002-321323 | 11/2002 |
| JP | 2003-082139 A | 3/2003 |
| JP | 2003-105123 A | 4/2003 |
| JP | 2004-290122 | 10/2004 |
| KR | A-2001-91048 | 10/2001 |
| WO | WO 2001-47710 A1 | 7/2001 |
| WO | WO 2002-07237 A2 | 2/2002 |
| WO | WO 2002-065561 A1 | 8/2002 |
| WO | WO 2004-01476 A1 | 3/2004 |
| WO | WO 2004-020511 A1 | 3/2004 |
| WO | WO 2005-113657 A1 | 12/2005 |

OTHER PUBLICATIONS

Machine translation of JP8-250097 (cited by Applicant on IDS filed May 22, 2014), published Sep. 27, 1996.*
Machine translation of JP-A-11-80395 published Mar. 26, 1999.*
Notice of Opposition to a European Patent for EP Application No. 05788195.5 dated Sep. 3, 2012.
Supplementary European Search Report (PCT/JP200508013) dated Jun. 16, 2010.

* cited by examiner

*Primary Examiner* — Monique Jackson
(74) *Attorney, Agent, or Firm* — Finnegan, Henderson, Farabow, Garrett & Dunner, LLP

(57) ABSTRACT

Disclosed is a polyolefin microporous membrane including a multilayer film having two or more layers. In this polyolefin microporous membrane, at least one surface layer has a thickness of not less than 0.2 μm but not more than 5 μm and contains inorganic particles, while at least one layer contains a polyethylene and has an air permeability of not less than 50 second/100 cc but not more than 1000 second/100 cc and a puncture strength of not less than 3.0 N/20 μm.

10 Claims, No Drawings

POLYOLEFIN MICROPOROUS MEMBRANE

This is a division of application Ser. No. 11/664,276, §371(c) date of Mar. 30, 2007, which is the National Stage of PCT/JP05/18013, filed Sep. 29, 2005, and claims priority to JP 2004-290122, filed Oct. 1, 2004, all of which are incorporated herein by reference.

TECHNICAL FIELD

The present invention relates to a polyolefin microporous membrane, particularly, to a polyolefin microporous membrane suitable as separators for lithium ion batteries, precision filter membranes, separators for capacitors, and materials for fuel cells.

BACKGROUND ART

Polyolefin microporous membranes are used as precision filter membranes, separators for batteries, separators for capacitors, materials for fuel cells, etc., and particularly, used as separators for lithium ion batteries. Recently, lithium ion batteries are used for miniature electronic instruments such as portable telephones and notebook type personal computers, and it is further attempted to apply them to electric cars, small motorbikes, etc.

Polyethylene microporous membranes are used as separators for lithium ion batteries because they are high in permeability, and besides they have a function to clog the communicating pores upon melting the polymer at 130-150° C. and to shut-down the current in order to ensure safety of the batteries. The term "shut-down" means a phenomenon that the pores of microporous membrane is clogged with molten resin to increase electrical resistance of the membrane to intercept the flow of lithium ions. When a microporous membrane is used as a separator of batteries, the shut-down temperature is desirably as low as possible from the viewpoint of ensuring the safety. Furthermore, as a function of separator, it is also necessary that the membrane maintains the shape of film after clogging of the pores to hold the insulation between electrodes. That is, if the temperature of battery further rises after shut-down of separators, fluidization of separator begins to cause decrease of electrical resistance, resulting in restoration of current. This temperature is called short-circuit temperature. Therefore, it is desired that the short-circuit temperature is higher.

With increase of function of small electronic instruments, increase of capacity of lithium ion batteries per unit volume is demanded. Thus, the higher safety at high temperatures is also required. For example, the lithium ion batteries are demanded to hold further safety at high temperatures considering extraneous heat generation of batteries, and simultaneously to maintain characteristics at high temperatures. In order to attain high capacity, it is a solution to thin the separators as much as possible and pack the electrodes as many as possible. When electrodes are packed, the inside of the battery is in the state of being densely packed, which causes the problem of low impregnation with electrolyte. Furthermore, when members of battery are wound, stronger mechanical load is applied to separators, and hence the separators are required to have a high mechanical strength even when they are thinned. Furthermore, it is also necessary to improve the output characteristics of the battery in the state of electrodes being densely packed, and hence a high permeability is also required for separators. Under the circumstances, there is demanded development of separators which have the above-mentioned functions, and furthermore high impregnation with electrolyte, mechanical strength, permeability, and storage characteristics at high temperatures when they are used in the batteries.

Patent Document 1 discloses a laminated sheet product comprising at least two layers in which a filler is contained in the second layer at a high content for the purpose of developing a high heat resisting temperature as a separator. However, according to the technology disclosed in this document, the separators can hardly be thinned, and it is difficult to attain increased capacity of battery per unit volume. Moreover, in the examples of Patent Document 1, large agglomerates are removed by extruding through two wire nets of 40 mesh. According to this method, since agglomerates passing through the nets are present, the portions where the agglomerates which have passed through the nets are present are low in mechanical strength to cause occurrence of pinholes. Furthermore, since agglomerates are removed, there sometimes occurs local ununiformity in composition. Therefore, the task is to improve uniformity of membrane.

Patent Document 2 discloses a separator in which a layer of an inorganic material-containing porous membrane comprising a polyolefin resin and an inorganic powder and a layer of an organic porous membrane comprising 100% by mass of a polyolefin resin are alternately laminated. In this document, impregnation with electrolyte, shut-down characteristics and heat resistance are attained. However, the inorganic material-containing membrane has a thickness of 10-20 μm, and the organic porous membrane is obtained by subjecting the inorganic material-containing porous membrane to extraction and removal with an alkali solution or the like. Therefore, further thinning of the separator is difficult, and attainment of increase in capacity of battery per unit volume is difficult. Moreover, only such an organic porous membrane as high in porosity can be produced, and hence the membrane strength tends to decrease. Further, in the examples of Patent Document 2, the separator is produced by superposing the inorganic material-containing porous membrane and the organic porous membrane, and hence the layers of the separator do not closely contact with each other, and the separators may slip off during fabrication of battery.

Patent Document 1: Japanese Patent No. 2108985
Patent Document 2: JP-A-2001-266828

DISCLOSURE OF INVENTION

Problem to be Solved by the Invention

An object of the present invention is to provide a polyolefin microporous membrane which is excellent in permeability and impregnation with electrolyte, can be thinned to further thin thickness, is high in mechanical strength even when thinned to further thin thickness, and excellent in high-temperature storage characteristics when used in batteries and which is suitable as separators for lithium ion batteries, precision filter membranes, separators, and materials for fuel cells.

Means for Solving the Problem

As a result of intensive research conducted by the inventors on the composition of a surface layer of a laminated film having two or more layers, the membrane structure and the method for dispersion of inorganic particles, it has been found that the above problems can be solved, and the present invention has been accomplished.

That is, the present invention is as follows.

(1) A polyolefin microporous membrane comprising a laminated film having two or more layers in which the surface layer on at least one side has a thickness of 0.2 µm or more and 5 µm or less and contains inorganic particles, and at least other one layer contains polyethylene and which has a gas transmission rate of 50 second/100 cc or more and 1000 second/100 cc or less and a piercing strength of 3.0 N/20 µm or more.

(2) A polyolefin microporous membrane described in (1) which comprises a laminated film having three or more layers.

(3) A polyolefin microporous membrane described in (1) or (2), wherein the surface layer on at least one side having a thickness of 0.2 µm or more and 5 µm or less contains 5% by mass or more and 60% by mass or less of inorganic particles and 5% by mass or more and 95% by mass or less of polypropylene.

(4) A polyolefin microporous membrane described in (1) or (2), wherein the surface layer on at least one side having a thickness of 0.2 µm or more and 5 µm or less contains 5% by mass or more and 60% by mass or less of inorganic particles, 5% by mass or more and 90% by mass or less of polypropylene, and 5% by mass or more and 90% by mass or less of polyethylene.

(5) A polyolefin microporous membrane described in (1) or (2), wherein the surface layer on at least one side having a thickness of 0.2 µm or more and 5 µm or less contains 5% by mass or more and 60% by mass or less of inorganic particles, 20% by mass or more and 90% by mass or less of polypropylene, and 5% by mass or more of polyethylene, and at least other one layer contains 30% by mass or more of polyethylene and contains no inorganic particles.

(6) A polyolefin microporous membrane described in any one of (1)-(5) which has a total thickness of 2 µm or more and 50 µm or less.

(7) A polyolefin microporous membrane described in any one of (1)-(5) which has a total thickness of 5 µm or more and 30 µm or less.

(8) A polyolefin microporous membrane described in any one of (1)-(7), wherein the ratio of breaking strength in MD to breaking strength in TD is 0.1 or more and 8.0 or less.

(9) A polyolefin microporous membrane described in any one of (1)-(8), wherein the inorganic particles are oxide or nitride of one of silicon, aluminum and titanium.

(10) A polyolefin microporous membrane described in any one of (1)-(9) which is obtained through a step kneading a polyolefin resin, inorganic particles and a plasticizer in the amounts satisfying the following formula (1):

$$0.6 \leq \text{weight of plasticizer}/(\text{oil absorption for plasticizer} \times \text{weight of inorganic particles} \times \text{density of plasticizer}) \times 100 \leq 1.2 \quad (1)$$

(11) A polyolefin microporous membrane described in any one of (1)-(10) which is obtained by forming a laminated sheet by co-extrusion method, subjecting the sheet to biaxial stretching, and extracting the plasticizer.

(12) A separator for lithium ion batteries which uses the polyolefin microporous membrane described in any one of (1)-(11).

BEST MODE FOR CARRYING OUT THE INVENTION

The polyolefin microporous membrane and a method for producing the same according to the present invention will be explained below.

The present invention relates to a polyolefin microporous membrane comprising a laminated film having two or more layers, preferably three layers. From the viewpoint of productivity, more preferably the membrane has a three-layer structure including two kind of layers in which the surface two layers have the same composition, and the interlayer has a composition different from that of the surface layers.

The surface layer contains inorganic particles for attaining impregnation with electrolyte and high-temperature storage characteristics when the membrane is used in batteries, and the thickness must be thin for satisfying both the permeability and the mechanical strength. Furthermore, the interlayer must contain polyethylene for giving permeability and shut-down characteristics.

The content of inorganic particles in the surface layer is preferably 5% by mass or more and 60% by mass or less, more preferably 10% by mass or more and 50% by mass or less, further preferably 20% by mass or more and 40% by mass or less. The content of inorganic particles is preferably 5% by mass or more from the viewpoints of impregnation with electrolyte and high-temperature storage characteristics of batteries, and preferably 60% by mass or less from the viewpoints of mechanical strength and membrane formability.

As the inorganic particles, preferred is an oxide or nitride of one of silicon, aluminum and titanium, and, for example, silica and alumina are suitable. More preferred are inorganic particles the surface of which is subjected to hydrophobic treatment from the viewpoint of dispersibility of polyolefin in the plasticizer. Furthermore, as for the inorganic particles used in the present invention, the oil absorption for the plasticizer used is preferably 150 ml/100 g or more, more preferably 150 ml/100 g or more and 1000 ml/100 g or less, further preferably 150 ml/100 g or more and 500 ml/100 g or less. In the case of the oil absorption being 150 ml/100 g or more, when the polyolefin resin and plasticizer are melt kneaded with the inorganic particles and extruded to make a sheet, agglomerates are hardly produced in the sheet and the sheet can be stretched at a high ratio, and a thin membrane of high strength can be obtained. In the case of the oil absorption being 1000 ml/100 g or less, the bulk density of the inorganic particles is high and hence handling in production is easy, and in addition, agglomerates are hardly produced.

In order to further improve the high-temperature storage characteristics and high heat resistance characteristics of the batteries in which the polyolefin microporous membranes of the present invention are used as separators, it is preferred that the surface layer contains 5% by mass or more and 95% by mass or less of polypropylene. The content of polypropylene is more preferably 5% by mass or more and 90% by mass or less, further preferably 20% by mass or more and 90% by mass or less, most preferably 30% by mass or more and 80% by mass or less.

Moreover, the surface layer may contain a polyolefin such as polyethylene in addition to polypropylene. In this case, the polyolefin may be used alone or in admixture with polypropylene. For thinning the separator to 20 µm or less, the layer having shut-down function is preferably thick, and most preferably all the layers have shut-down function. Therefore, the surface layer preferably contains polyethylene. In this case, the difference in shut-down temperature between the surface layer and the interlayer is preferably smaller than 10° C., and the surface layer preferably contains 5% by mass or more and 90% by mass or less of polyethylene.

The polypropylenes used in this case include homopolymer, random copolymer, block copolymer, and the like, and one or a mixture of two or more of them can be used. The polymerization catalyst is not particularly limited, and, for example, Ziegler-Natta catalysts, metallocene catalysts, etc. can be used. Furthermore, the stereoregulaity is also not particularly limited, and isotactic, syndiotactic and atactic polypropylene can be used.

The polyethylene used in this case includes high density polyethylene, medium-density polyethylene or low-density polyethylene, and may be used alone or in admixture of two or more. The polymerization catalyst is also not particularly limited, and, for example, Ziegler-Natta catalysts, Phillips catalysts, metallocene catalysts, etc. can be used. From the point of mechanical strength, high density polyethylene is preferred. From the point of satisfying both the mechanical strength and high permeability, the viscosity average molecular weight of polyethylene is preferably 100,000 or more and 12,000,000 or less, more preferably 200,000 or more and 3,000,000 or less, further preferably 200,000 or more and 2,000,000 or less, most preferably 200,000 or more and 1,000,000 or less.

The thickness of the surface layer on at least one side in the present invention is 0.2 μm or more and 5 μm or less and preferably 0.5 μm or more and 3 μm or less. The thickness is 0.2 μm or more from the points of impregnation with electrolyte and uniformity of membrane, and 5 μm or less from the points of permeability and mechanical strength.

The other one layer in the present invention means a layer other than the surface layer having a thickness of 0.2 μm or more and 5 μm or less. For example, when the polyolefin microporous membrane comprises three layers, it is an interlayer or a surface layer which is different from the interlayer and the surface layer having a thickness of 0.2 μm or more and 5 μm or less. The other one layer contains polyethylene as an essential component. The amount of polyethylene in the other one layer is preferably 5% by mass or more, more preferably 30% by mass or more, further preferably 50% by mass or more, most preferably 80% by mass from the points of permeability and shut-down temperature. If necessary, the other one layer may contain inorganic particles in such an amount as not damaging the shut-down characteristics and mechanical strength.

Furthermore, the polyolefin composition may contain additives such as antioxidants and nucleating agents in a suitable amount so long as the effects of the present invention are not damaged.

The polyolefin microporous membrane of the present invention is produced, for example, by the steps of melt kneading a polyolefin resin, inorganic particles and a plasticizer or a polyolefin resin and a plasticizer, extrusion molding the kneaded product, stretching the extruded product, extracting the plasticizer, and heat treating the resulting product.

As a method for melt kneading a polyolefin resin, inorganic particles and a plasticizer in the present invention, there is one which comprises previously kneading a polyolefin resin, inorganic particles and a plasticizer at a given proportion by a Henschel mixer or the like, then introducing the kneaded product into an extruder, introducing a plasticizer in an optional amount while melting with heat, and carrying out further kneading. Specifically, a polyolefin resin and inorganic particles, and a plasticizer in an amount specified below are previously kneaded by a Henschel mixer or the like, the resulting kneaded product is introduced into a twin-screw extruder, and the remainder of the plasticizer which has been added in the specified amount can be side-fed to the extruder. By this method, a sheet in which inorganic particles are satisfactorily dispersed can be obtained, and the sheet can be stretched at a high ratio without causing break of the layer containing inorganic particles.

Specifically, a polyolefin resin, inorganic particles and a plasticizer in the amounts satisfying the following formula (1) are previously kneaded.

$$0.6 \leq \text{weight of plasticizer}/(\text{oil absorption for plasticizer} \times \text{weight of inorganic particles} \times \text{density of plasticizer}) \times 100 \leq 1.2 \quad (1)$$

When the value of the formula is 0.6 or more, the inorganic particles properly hold the plasticizer, and the difference between bulk density of the inorganic particles and that of the polyolefin resin is small, and hence the inorganic particles are uniformly dispersed. When it is 1.2 or less, agglomeration of the inorganic particles caused by kneading the inorganic particles with a large amount of the plasticizer can be inhibited. More preferred condition is 0.7 or more and 1.0 or less. As far as the final proportions in the kneaded product added are within the above range, even when the polyolefin resin, the inorganic particles and the plasticizer are kneaded at one time by an extruder or the like, a sheet in which the inorganic particles are satisfactorily dispersed can be obtained.

The melt kneading can be performed using a single-screw extruder, a twin-screw extruder or the like. The melt kneading temperature is preferably 160° C. or higher and 300° C. or lower.

The plasticizer is preferably an organic compound which can compatibilize with polyolefin at higher than its melting point when mixed with polyolefin. As the plasticizers, mention may be made of, for example, hydrocarbons such as liquid paraffin and paraffin wax, phthalic acid esters such as di-2-ethylhexyl phthalate, diheptyl phthalate and dibutyl phthalate, and sebacic acid esters, stearic acid esters, adipic acid esters, phosphoric acid esters, and the like. These plasticizers may be used each alone or in admixture of two or more. The proportion of the plasticizer in the whole mixture melt kneaded is preferably 20% by mass or more and 80% by mass or less.

As for the extrusion molding, there is a method of extruding from a sheet die such as a slit die or T-die, followed by cooling with casting roll, an inflation method or the like, whereby a gel sheet can be obtained. The polyolefin microporous membrane of the present invention can be produced by either of a method of integrating the gel sheets constituting the respective layers which are extruded from the respective extruders, followed by co-extruding through one die or a method of superposing the gel sheets constituting the respective layers and fusion bonding them by heating. The co-extrusion method is preferred because a high interlaminar strength can easily be obtained and communicating pores can be easily formed between layers, and thus a high permeability can be easily maintained, and the method is superior in productivity.

As for the stretching, biaxial stretching is preferred because the resulting membrane is high in mechanical strength and superior in balance of physical properties in the machine direction and the transverse direction. Preferred are simultaneous biaxial stretching and sequential biaxial stretching. The stretching temperature is preferably 100° C. or higher and 135° C. or lower. The stretching ratio is preferably 3 times or more and 200 times or less in area ratio from the viewpoint of membrane strength.

Extraction of the plasticizer is carried out by immersing the membrane in an extraction solvent, and thereafter the membrane is sufficiently dried. Desirably, the extraction solvent is a poor solvent for polyolefin and inorganic particles and a good solvent for plasticizer and has a boiling point lower than the melting point of polyolefin. Examples of the extraction solvent are chlorine based solvents such as methylene chloride and 1,1,1-trichloroethane, ketones such as methyl ethyl ketone and acetone, halogen-based organic solvents such as hydrofluorocarbon, hydrofluoro ether, cyclic hydrofluorocarbon, perfluorocarbon and perfluoro ether, ethers such as diethyl ether and tetrahydrofuran, hydrocarbons such as n-hexane and cyclohexane, and alcohols such as methanol and isopropyl alcohol. These extraction solvents may also be used in combination of two or more. Of these solvents, methylene chloride is particularly preferred.

After extraction of plasticizer, if necessary, the membrane may be stretched for adjustment of physical properties such as thickness and gas transmission rate. The stretching after extraction may be monoaxial stretching, simultaneous biaxial stretching, or sequential biaxial stretching, and preferred are simultaneous biaxial stretching and sequential biaxial stretching. The stretching temperature is preferably 100° C. or higher and 135° C. or lower. The stretching ratio is preferably more than 1 time and 10 times or less in area ratio.

In order to reduce shrinkage of membrane in an atmosphere of high temperature, a heat treatment is carried out by relaxing shrinkage stress in widthwise direction, lengthwise direction or both directions at a temperature in the range of 100° C. or higher and the melting point or lower of polyethylene using, for example, a tenter, a monoaxial stretching machine or both of them.

The polyolefin microporous membrane produced as mentioned above preferably has a three-dimensional network structure in which the pores are three-dimensionally entangled in each layer. In this case, it is preferred that the three-dimensional network is connected between the layers. The three-dimensional network structure is such a structure that the surface is venous, and membrane structure at sections in optional directions of three-dimensional coordinate axes is spongy. The term "venous" means a state of fibrils forming a network. These structures can be confirmed by observing the surface and section with a scanning electron microscope. The fibril diameter of the three-dimensional network structure is preferably 0.01 μm or more and 0.3 μm or less, and can be observed with a scanning electron microscope.

The polyolefin microporous membrane of the present invention has the features that it has excellent permeability, mechanical strength and impregnation with electrolyte and high short-circuit temperature given by adjusting the thickness of the surface layer and incorporating inorganic particles, and it has low shut-down temperature by containing polyethylene in the other one layer. By containing polypropylene in the surface layer, high-temperature storage characteristics and high heat resistance characteristics can be further improved.

The polyolefin microporous membrane of the present invention preferably has the following physical properties.

(1) The total thickness of the microporous membrane comprising a laminated film having two or more layers is preferably 2 μm or more and 50 μm or less for inhibiting insufficient insulation of batteries. The thickness is more preferably 5 μm or more and 30 μm or less, further preferably 7 μm or more and 25 μm or less.

(2) The thickness of the surface layer is 0.2 μm or more and 5 μm or less, more preferably 0.5 μm or more and 3 μm or less.

(3) The gas transmission rate is 50 sec/100 cc from the points of mechanical strength and self discharge, and 1000 sec/100 cc or less from the points of cycle characteristics and rate characteristics of batteries. The gas transmission rate is preferably 70 sec/100 cc or more and 800 sec/100 cc or less, more preferably 100 sec/100 cc or more and 600 sec/100 cc or less.

(4) The piercing strength is 3.0 N/20 μm or more from the point of fabrication of batteries. It is preferably 4.0 N/20 μm or more.

(5) The breaking strength is 500 kg/cm$^2$ or more in both MD and TD from the point of fabrication of batteries. The ratio of breaking strength in MD to breaking strength in TD is preferably 0.1 or more and 8.0 or less, more preferably 0.1 or more and 5.0 or less, and further preferably 0.5 or more and 2.0 or less.

(6) As to the impregnation property with electrolyte, for example, when 1 mol/L lithium hexafluorophosphate solution (solvent: propylene carbonate) is used, the shorter the time required for clarification of the solution, the more preferred. Specifically, the time is preferably 30 seconds or less, more preferably 20 seconds or less, further preferably 10 seconds or less.

(7) The high-temperature storage characteristic explained in the following test method (8) is 70% or more, more preferably 75% or more. If the high-temperature storage characteristic is less than 70%, battery characteristics at high temperatures deteriorate. The high-temperature storage characteristic is obtained from capacity retention rate in the case of storing at 60° C. for 7 days.

The present invention will be further explained by the following examples, which should not be construed as limiting the invention. The test methods shown in the examples are as follows.

(1) Membrane Thickness (μm)

The thickness is measured by a dial gauge (Trademark PEACOCK No. 25 manufactured by Ozaki Mfg. Co., Ltd.). A sample of 10 mm in MD×10 mm in TD is cut out, and thicknesses at 9 portions (3 points×3 points) in lattice pattern are measured. The average value is taken as a thickness (μm).

(2) Thickness of Surface Layer (μm)

The thickness is measured by observation of section with a scanning electron microscope or, if the layer can be peeled off, thickness of the peeled layer is measured by the method of above (1).

(3) Gas Transmission Rate (Second/100 cc)

This is measured in accordance with JIS P-8117 using a Gurley-type tester for gas transmission rate (G-B2 (trademark) manufactured by Toyo Seisaku-sho, Ltd.).

(4) Piercing Strength (N/20 μm)

A net piercing strength (N) as a maximum puncturing load is obtained by conducting a piercing test under the conditions of a curvature radius of needle tip of 0.5 mm and a piercing speed of 2 mm/sec using a handy compression tester KES-G5 manufactured by Kato Tech Co., Ltd. The piercing strength in terms of 20 μm thickness (N/20 μm) is calculated by multiplying the green piercing strength (N) by 20 (μm)/thickness (μm).

(5) Ratio A of Breaking Strength in MD to Breaking Strength in TD

The breaking strength is measured under the following conditions using a tensile tester (AUTOGRAPH AG-A manufactured by Shimadzu Corporation).

Shape of sample: length of sample×width of sample=100 mm×10 mm

Distance between chucks: 50 mm

Rate of pulling: 200 mm/min

Then, strengths of the sample in MD and TD at the time of breaking are obtained by the above-mentioned method, and the value A is calculated by the following formula.

$$A=(\text{breaking strength in } MD)/(\text{breaking strength in } TD)$$

(6) Oil Absorption for Plasticizer ml/100 g)

This is measured by a plasticizer oil absorption measurement device FRONTEX S410. 5 g of inorganic particles are introduced into the measurement device, and, while kneading, a plasticizer is added. The amount (ml) of the plasticizer added is measured when the torque at the time of kneading increases and decreases to 70% of the maximum torque, and the oil absorption is calculated from the resulting amount of the plasticizer (ml) and weight of inorganic particles (g) using the following formula.

$$\text{Oil absorption for plasticizer(ml/100 g)}=\text{amount of added plasticizer/weight of inorganic particles}\times 100$$

(7) Impregnation with Electrolyte 1 mol/L lithium hexafluorophosphate solution (solvent: propylene carbonate) as an electrolyte is dropped onto a microporous membrane in a glove compartment. Impregnation is judged to be good (O) when 80% or more of the surface at which the droplets of the electrolyte and the microporous membrane contact is transparent after lapse of 30 seconds, and the impregnation is judged to be insufficient (x) when less than 80% is transparent.

(8) High-Temperature Storage Characteristics (%)

(a) Preparation of Positive Electrode 92.2% by weight of a lithium cobalt composite oxide $LiCoO_2$ as a positive electrode active material, 2.3% by weight of flake graphite and 2.3% by weight of flake acetylene black as conducting materials and 3.2% by weight of polyvinylidene fluoride (PVdF) as a binder are dispersed in N-methylpyrrolidone (NMP) to prepare a slurry. This slurry is coated on one side of an aluminum foil of 20 μm thick as a positive electrode collector by a die coater, dried at 130° C. for 3 minutes and then compression molded by a roll press. In this case, the coating amount of the positive electrode active material is 250 g/m², and bulk density of the active material is 3.00 g/cm³. This is stamped to a circle of 2.00 cm² in area.

(b) Preparation of Negative Electrode 96.9% by weight of artificial graphite as a negative electrode active material, and 1.4% by weight of an ammonium salt of carboxymethylcellulose and 1.7% by weight of styrene-butadiene copolymer latex as binders are dispersed in purified water to prepare a slurry. This slurry is coated on one side of a copper foil of 12 μm thick as a negative electrode collector by a die coater, dried at 120° C. for 3 minutes and then compression molded by a roll press. In this case, the coating amount of the negative electrode active material is 106 g/m², and bulk density of the active material is 1.35 g/cm³. This is stamped to a circle of 2.05 cm² in area.

(c) Fabrication of Simple Battery

A simple lithium ion battery is fabricated by packing a polyolefin microporous membrane, a positive electrode, a negative electrode and a 1 mol/L lithium hexafluorophosphate solution (solvent: ethylene carbonate/ethylmethyl carbonate=1/2) as an electrolyte in an aluminum cell and a stainless steel cell.

(d) Evaluation of High-Temperature Storage Characteristics

The simple battery fabricated as mentioned above is charged for 6 hours in total by a method which comprises charging the battery to a battery voltage of 4.2 V at a current value of 3 mA (about 0.5 C) in an atmosphere of 25° C. and, after reaching the voltage, starting to lower the current value from 3 mA while keeping the voltage at 4.2 V. Thereafter, the battery is discharged to a battery voltage of 3.0 V at a current value of 3 mA.

Then, the battery is charged for 3 hours in total by a method which comprises charging the battery to a battery voltage of 4.2 V at a current value of 6 mA (about 1.0 C) in an atmosphere of 25° C. and, after reaching the voltage, starting to lower the current value from 6 mA while keeping the voltage at 4.2 V. The battery is discharged to a battery voltage of 3.0 V at a current value of 6 mA. The discharge capacity in this case is referred to as A (mAh).

Then, the battery is charged for 3 hours in total by a method which comprises charging the battery to a battery voltage of 4.2 V at a current value of 6 mA (about 1.0 C) in an atmosphere of 25° C. and, after reaching the voltage, starting to lower the current value from 6 mA while keeping the voltage at 4.2 V. The battery kept in the charged state is stored for 7 days in an atmosphere of 60° C. Thereafter, the battery is taken out and discharged to a battery voltage of 3.0 V at a current value of 6 mA in an atmosphere of 25° C. Thereafter, the battery is charged for 3 hours in total by a method which comprises charging the battery to a battery voltage of 4.2 V at a current value of 6 mA (about 1.0 C) in an atmosphere of 25° C. and, after reaching the voltage, starting to lower the current value from 6 mA while keeping the voltage at 4.2 V. The battery is discharged to a battery voltage of 3.0 V at a current value of 6 mA. The discharge capacity in this case is referred to as B (mAh). From the ratio of B to A, a capacity retention rate is calculated and is taken as the high-temperature storage characteristics.

The present invention will be explained by the following examples.

Example 1

32 parts by mass of polypropylene (density: 0.90, viscosity average molecular weight: 300,000) and 8 parts by mass of silica (oil absorption: 200 ml/100 g) as materials of surface layer, 2 parts by mass of bis(p-ethylbenzylidene) sorbitol as a nucleating agent, 0.3 part by mass of tetrakis-[methylene-(3',5'-di-t-butyl-4'-hydroxyphenyl)propionate] methane as an antioxidant, and 12 parts by mass of liquid paraffin (kinematic viscosity at 37.78° C.: 75.90 cSt, density: 0.868) as a plasticizer were blended and stirred by a mixer to prepare a raw material. 40 parts by mass of a high density polyethylene (density: 0.95, viscosity average molecular weight: 250,000) as a material of interlayer and 0.3 part by mass of tetrakis-[methylene-(3',5'-di-t-butyl-4'-hydroxyphenyl)propionate]methane as an antioxidant were blended to prepare a raw material. The respective blends were introduced through feeders of two twin-screw extruders having a bore diameter of 25 mm and L/D=48. Furthermore, 48 parts by mass of liquid paraffin for the surface layer and 60 parts by mass of liquid paraffin for the inter layer were poured into the respective extruders by side feeding, and adjustment was made so that the extrusion amount of the both surface layers and that of the interlayer were 5 kg and 15 kg per 1 hour, respectively, followed by kneading under the conditions of 200° C. and 200 rpm and then extruding from a T-die provided at the tip of the extruder and capable of carrying out co-extrusion (three layers including two same layers and one different layer). The extruded product was immediately cooled and solidified and formed into a sheet of 1.5 mm thick by a cast roll cooled to 25° C. This sheet was stretched to 7×7 times at 124° C. by a simultaneous biaxial stretching machine, and then immersed in methylene chloride to extract and remove liquid paraffin, then dried and stretched in transverse direction to 1.5 time at 125° C. by a tenter stretching machine. Thereafter, this stretched sheet was relaxed by 7% in widthwise direction at 130° C. to carry out the heat treatment to obtain a microporous membrane having three layer structure in which the two surface layers were the same in composition and the interlayer is different in composition from that of the two surface layers. The physical properties of the resulting microporous membrane are shown in Table 1.

Example 2

A microporous membrane was produced in the same manner as in Example 1, except that a high density polyethylene (density: 0.95, viscosity average molecular weight: 250,000) was used in place of polypropylene as the material of the surface layer. The physical properties of the resulting microporous membrane are shown in Table 1.

Example 3

A microporous membrane was produced in the same manner as in Example 1, except that 36 parts by mass of polypropylene (density: 0.90, viscosity average molecular weight: 300,000) as a material of the surface layer, 4 parts by mass of silica (oil absorption: 200 ml/100 g) and 6 parts by mass of liquid paraffin as a plasticizer were blended and stirred by a mixer to prepare a raw material, and, furthermore, 54 parts by mass of liquid paraffin was charged in the extruder for the surface layer by side feeding. The physical properties of the resulting microporous membrane are shown in Table 1.

Example 4

A microporous membrane was produced in the same manner as in Example 1, except that the thickness of the sheet was 0.9 mm. The physical properties of the resulting microporous membrane are shown in Table 1.

Example 5

A microporous membrane was produced in the same manner as in Example 1, except that the thickness of the sheet was 3.0 mm. The physical properties of the resulting microporous membrane are shown in Table 1.

Example 6

A microporous membrane was produced in the same manner as in Example 1, except that the extrusion amount of the surface layer was 2.5 kg per 1 hour. The physical properties of the resulting microporous membrane are shown in Table 1.

Example 7

A microporous membrane was produced in the same manner as in Example 1, except that the extrusion amount of the surface layer was 10 kg per 1 hour. The physical properties of the resulting microporous membrane are shown in Table 1.

Example 8

A microporous membrane was produced in the same manner as in Example 1, except that 24 parts by mass of polypropylene (density: 0.90, viscosity average molecular weight: 300,000) and 16 parts by mass of silica (oil absorption: 200 ml/100 g) as materials of the surface layer and 20 parts by mass of liquid paraffin as a plasticizer were blended and stirred by a mixer to prepare a raw material, and furthermore 40 parts by mass of liquid paraffin was poured into the extruder for the surface layer by side feeding. The physical properties of the resulting microporous membrane are shown in Table 1.

Example 9

A microporous membrane was produced in the same manner as in Example 1, except that 25 parts by mass of polypropylene (density: 0.90, viscosity average molecular weight: 300,000), 7 parts by mass of a high density polyethylene (density: 0.95, viscosity average molecular weight: 250,000) and 8 parts by mass of silica (oil absorption: 200 ml/100 g) were used as the materials of the surface layer. The physical properties of the resulting microporous membrane are shown in Table 1.

Example 10

A microporous membrane was produced in the same manner as in Example 1, except that 32 parts by mass of polypropylene (density: 0.90, viscosity average molecular weight: 300,000) and 8 parts by mass of alumina (oil absorption: 180 ml/100 g) as materials of the surface layer, and 10 parts by mass of liquid paraffin as a plasticizer were blended and stirred by a mixer to prepare a raw material, and furthermore 50 parts by mass of liquid paraffin was poured into the extruder for the surface layer by side feeding. The physical properties of the resulting microporous membrane are shown in Table 1.

Example 11

A microporous membrane was produced in the same manner as in Example 1, except that 36 parts by mass of a high density polyethylene (density: 0.95, viscosity average molecular weight: 250,000) and 4 parts by mass of silica (oil absorption: 200 ml/100 g) as materials of the interlayer, and 6 parts by mass of liquid paraffin as a plasticizer were blended and stirred by a mixer to prepare a raw material, and furthermore 54 parts by mass of liquid paraffin was poured into the extruder for the interlayer by side feeding. The physical properties of the resulting microporous membrane are shown in Table 1.

Example 12

A polyolefin microporous membrane of laminated film structure comprising two layers was produced by changing the shape of T-die. 32 parts by mass of polypropylene (density: 0.90, viscosity average molecular weight: 300,000) and 8 parts by mass of silica (oil absorption 200 ml/100 g) as materials of the layer containing inorganic particles, 2 parts by mass of bis(p-ethylbenzylidene)sorbitol as a nucleating agent, 0.3 part by mass of tetrakis-[methylene-(3',5'-di-t-butyl-4'-hydroxyphenyl)propionate]methane as an antioxidant, and 12 parts by mass of liquid paraffin (kinematic viscosity at 37.78° C.: 75.90 cSt) as a plasticizer were blended and stirred by a mixer to prepare a raw material. 40 parts by mass of a high density polyethylene (density: 0.95, viscosity average molecular weight: 250,000) as a material of the other one layer and 0.3 part by mass of tetrakis-[methylene-(3',5'-di-t-butyl-4'-hydroxyphenyl)propionate]methane as an antioxidant were blended to prepare a raw material. The respective blends were introduced through feeders of two twin-screw extruders having a bore diameter of 25 mm and L/D=48. Furthermore, 48 parts by mass of liquid paraffin for the layer containing inorganic particles and 60 parts by mass of liquid paraffin for the other one layer were poured into the respective extruders by side feeding, and adjustment was made so that the extrusion amount of the layer containing inorganic particles and that of the other one layer were 2.5 kg and 17.5 kg per 1 hour, respectively, followed by kneading under the conditions of 200° C. and 200 rpm and then extruding from a T-die provided at the tip of the extruder and capable of carrying out co-extrusion (two layers different from each other). Thereafter, a microporous membrane was produced in the same manner as in Example 1. The physical properties of the resulting microporous membrane are shown in Table 1. In evaluation of high-temperature storage characteristics, the simple battery was fabricated so that the layer containing inorganic particles contacted with the positive electrode side.

Example 13

A microporous membrane was produced in the same manner as in Example 1, except that 12 parts by mass of polypropylene (density: 0.90, viscosity average molecular weight: 300,000) and 28 parts by mass of silica (oil absorption: 200 ml/100 g) were used as the materials of the surface layer. However, the surface layer was broken at the time of stretching and the microporous membrane could not be stably produced. The physical properties measured in the unbroken part are shown in Table 1.

Example 14

A microporous membrane was produced in the same manner as in Example 1, except that 32 parts by mass of polypropylene (density: 0.90, viscosity average molecular weight: 300,000) and 5 parts by mass of silica (oil absorption: 200 ml/100 g) as materials of the surface layer, and 8 parts by mass of liquid paraffin as a plasticizer were blended and stirred by a mixer to prepare a raw material, and, furthermore, 52 parts by mass of liquid paraffin was poured into the extruder for the surface layer by side feeding. However, the surface layer was broken at the time of stretching and the microporous membrane could not be stably produced. The physical properties measured in the unbroken parts are shown in Table 1.

Comparative Example 1

A microporous membrane was produced in the same manner as in Example 1, except that polypropylene (density: 0.90, viscosity average molecular weight: 300,000) was used in an amount of 40 parts by mass as the material of the surface layer, and silica was not added. The physical properties of the resulting microporous membrane are shown in Table 1. The gas transmission rate was high and impregnation with electrolyte was insufficient.

Comparative Example 2

A microporous membrane was produced in the same manner as in Example 1, except that the extrusion amount of the surface layer and that of the interlayer were adjusted to 10 kg and 5 kg per 1 hour, respectively. The physical properties of the resulting microporous membrane are shown in Table 1. The gas transmission rate exceeded 1000 sec/100 cc.

Comparative Example 3

32 parts by mass of polypropylene (density: 0.90, viscosity average molecular weight: 300,000) and 8 parts by mass of silica (oil absorption: 200 ml/100 g) as materials of surface layer, 2 parts by mass of bis(p-ethylbenzylidene)sorbitol as a nucleating agent, 0.3 part by mass of tetrakis-[methylene-(3',5'-di-t-butyl-4'-hydroxyphenyl)propionate]methane as an antioxidant, and 12 parts by mass of liquid paraffin (kinematic viscosity at 37.78° C.: 75.90 cSt) as a plasticizer were blended and stirred by a mixer to prepare a raw material. 40 parts by mass of a high density polyethylene (density: 0.95, viscosity average molecular weight: 250,000) as a material of interlayer and 0.3 part by mass of tetrakis-[methylene-(3',5'-di-t-butyl-4'-hydroxyphenyl)propionate]methane as an antioxidant were blended to prepare a raw material. The respective blends were introduced through feeders of two twin-screw extruders having a bore diameter of 25 mm and L/D=48. Furthermore, 48 parts by mass of liquid paraffin for the surface layer and 60 parts by mass of liquid paraffin for the inter layer were poured into the respective extruders by side feeding, and adjustment was made so that the extrusion amount of the surface layer and that of the interlayer were 2 kg and 6 kg per 1 hour, respectively, followed by kneading under the conditions of 200° C. and 200 rpm and then extruding from a T-die provided at the tip of the extruder and capable of carrying out co-extrusion (three layers including two same layers and one different layer). The extruded product was immediately cooled and solidified and formed into a sheet of 0.25 mm thick by a cast roll cooled to 25° C. This sheet was stretched to 6 times at 124° C. by a monoaxial stretching machine, and then this stretched film was immersed in methylene chloride to extract and remove liquid paraffin, and then dried to obtain a microporous membrane. The physical properties of the resulting microporous membrane are shown in Table 1. The piercing strength was less than 3.0 N/20 μm.

TABLE 1

|  | Total membrane thickness (μm) | Thickness of surface layer containing inorganic particles (μm) | Content of inorganic particles in the layer containing inorganic particles (wt %) | Formula 1 | Gas transmission rate (sec/100 cc) | Piercing strength (N/20 μm) | Ratio of breaking strengths (MD/TD) | Impregnation with electrolyte | High-temperature storage characteristics (%) |
|---|---|---|---|---|---|---|---|---|---|
| Example 1 | 20 | 2 | 20 | 0.9 | 430 | 5.2 | 0.8 | ○ | 77 |
| Example 2 | 20 | 2 | 20 | 0.9 | 210 | 5.4 | 1.1 | ○ | 71 |
| Example 3 | 20 | 2 | 10 | 0.9 | 460 | 5.1 | 0.8 | ○ | 76 |
| Example 4 | 10 | 1 | 20 | 0.9 | 290 | 7.3 | 1.3 | ○ | 77 |
| Example 5 | 40 | 5 | 20 | 0.9 | 720 | 4.3 | 0.7 | ○ | 76 |
| Example 6 | 20 | 1 | 20 | 0.9 | 320 | 5.2 | 0.8 | ○ | 77 |
| Example 7 | 20 | 4 | 20 | 0.9 | 630 | 4.8 | 1.0 | ○ | 76 |
| Example 8 | 20 | 2 | 40 | 0.7 | 360 | 5.1 | 0.8 | ○ | 76 |
| Example 9 | 20 | 2 | 20 | 0.9 | 280 | 5.0 | 0.8 | ○ | 74 |
| Example 10 | 20 | 2 | 20 | 0.8 | 480 | 4.4 | 0.8 | ○ | 75 |
| Example 11 | 20 | 2 | Surface layer 20 Interlayer 10 | 0.9 0.9 | 390 | 5.4 | 0.8 | ○ | 76 |
| Example 12 | 20 | 2 | 20 | 0.9 | 410 | 5.3 | 0.8 | ○ | 77 |
| Example 13 | 20 | 2 | 70 | 0.2 | 380 | 4.9 | — | ○ | 76 |
| Example 14 | 20 | 2 | 20 | 0.4 | 450 | 5.1 | — | ○ | 75 |
| Comparative Example 1 | 20 | 2 | 0 | — | 1010 | 5.2 | 0.8 | X | 72 |
| Comparative Example 2 | 20 | 8 | 20 | 0.9 | 1020 | 5.5 | 0.8 | ○ | 75 |
| Comparative Example 3 | 40 | 6 | 20 | 0.9 | 260 | 2.8 | 10.6 | ○ | 75 |

In Examples 13 and 14, measurement was carried out in the portion where surface layer did not break.

INDUSTRIAL APPLICABILITY

The polyolefin microporous membranes of the present invention can be used as precision filter membranes, separators for batteries, separators for capacitors, materials for fuel cell, and the like, and are particularly suitable as separators for lithium ion batteries.

The invention claimed is:

1. A lithium ion battery comprising a negative electrode, a positive electrode, lithium solution, and a polyolefin microporous membrane as a separator which comprises a laminated film of three layers made up of an interlayer between two surface layers, wherein each surface layer has a thickness of 1 μm or more and 4 μm or less and contains inorganic particles in an amount of 10% by mass or more and 40% by mass or less and wherein the interlayer contains polyethylene, but no inorganic particles; wherein the polyolefin microporous membrane has a gas transmission rate of 50 sec/100 cc or more and 1000 sec/100 cc or less wherein the gas transmission rate is measured in accordance with JIS P-8117 and a piercing strength of 3.0 N/20 μm or more wherein the piercing strength is measured using a needle tip with a radius of curvature of 0.5 mm and a piercing speed of 2 mm/s; and wherein the surface layers of the polyolefin microporous membrane are obtained through a step of kneading a polyolefin resin, the inorganic particles and a plasticizer in the amounts satisfying the following formula (1):

$$0.6 < \text{weight of plasticizer}/(\text{oil absorption for plasticizer} \times \text{weight of inorganic particles} \times \text{density of plasticizer}) \times 100 < 1.2, \quad (1)$$

and wherein the inorganic particles have an oil absorption for the plasticizer of 150 ml/100 g or more and 1000 ml/100 g or less.

2. The lithium on battery of claim 1, wherein the surface layer on at least one side contains 5% by mass or more and 90% by mass or less of polypropylene.

3. The lithium on battery of claim 1, wherein the surface layer on at least one side contains 5% by mass or more and 90% by mass or less of a mixture of polypropylene and polyethylene.

4. The lithium on battery of claim 1, wherein the surface layer on at least one side contains 20% by mass or more and 85% by mass or less of polypropylene, and contains 5% by mass or more of polyethylene, and the interlayer contains 30% by mass or more of polyethylene.

5. The lithium on battery of claim 1, wherein the polyolefin microporous membrane has a total thickness of more than 2 μm and 50 μm or less.

6. The lithium on battery of claim 1, wherein the polyolefin microporous membrane has a total thickness of 5 μm or more and 30 μm or less.

7. The lithium on battery of claim 1, wherein the inorganic particles are an oxide of silicon or aluminum.

8. The lithium on battery of claim 1, wherein the polyolefin microporous membrane is obtained by forming a laminated sheet from a mixture of a plasticizer with the polyolefin by co-extrusion method, subjecting the sheet to biaxial stretching, and extracting the plasticizer.

9. The lithium ion battery of claim 1, wherein the surface layer on at least one side contains 5% by mass or more and 90% by mass or less of a mixture of polypropylene and polyethylene, and the polyolefin microporous membrane has a total thickness of more than 2 μm and 50 μm or less.

10. The lithium on battery of claim 1, wherein the surface layer on at least one side contains 20% by mass or more and 85% by mass or less of polypropylene, and contains 5% by mass or more of polyethylene, and the layer other than a surface layer contains 30% by mass or more of polyethylene, and the polyolefin microporous membrane has a total thickness of more than 2 μm and 50 μm or less.

* * * * *

UNITED STATES PATENT AND TRADEMARK OFFICE
CERTIFICATE OF CORRECTION

PATENT NO. : 9,741,989 B2  
APPLICATION NO. : 14/280431  
DATED : August 22, 2017  
INVENTOR(S) : Masahiro Ohashi et al.

Page 1 of 1

It is certified that error appears in the above-identified patent and that said Letters Patent is hereby corrected as shown below:

In the Claims

In Claim 2, Column 16, Line 35, "The lithium on battery" should read --The lithium ion battery--.

In Claim 3, Column 16, Line 38, "The lithium on battery" should read --The lithium ion battery--.

In Claim 4, Column 16, Line 42, "The lithium on battery" should read --The lithium ion battery--.

In Claim 5, Column 16, Line 47, "The lithium on battery" should read --The lithium ion battery--.

In Claim 6, Column 16, Line 50, "The lithium on battery" should read --The lithium ion battery--.

In Claim 7, Column 16, Line 53, "The lithium on battery" should read --The lithium ion battery--.

In Claim 8, Column 16, Line 55, "The lithium on battery" should read --The lithium ion battery--.

In Claim 10, Column 16, Line 65, "The lithium on battery" should read --The lithium ion battery--.

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*